United States Patent Office 3,459,727
Patented Aug. 5, 1969

3,459,727
MIXED CHROMIUM-CONTAINING DYESTUFFS CONTAINING A MONOAZO AND A DISAZO DYESTUFF
Eginhard Steiner and Walter Biedermann, Basel, Switzerland, assignors to J. R. Geigy A.G., Basel, Switzerland
No Drawing. Filed Aug. 19, 1966, Ser. No. 573,451
Int. Cl. C09b 45/16, 45/26
U.S. Cl. 260—145                                       3 Claims

ABSTRACT OF THE DISCLOSURE

Chromium-containing azo dyestuffs which contain an optionally further substituted monosulfonated monoazo dyestuff moiety, obtained from a 6-nitro-2-amino-1-hydroxybenzene diazo component and a 1-phenyl-3-methylpyrazol-5-one coupling component, and a disazo dyestuff moiety free from sulfonic acid groups, which moieties are bonded co-ordinatively to a hexavalent chromium atom, as well as their use for the dyeing of natural and synthetic polyamide fiber materials and also of super polyurethane fibers are disclosed.

---

The invention concerns chromium-containing azo dye-sutffs which contain a mono and a disazo dyestuff bonded co-ordinatively to a hexavalent chromium atom. It also concerns a method of using these dyestuffs for the dyeing of natural and synthetic polyamide fiber materials such as wool, silk, leather, furs, nylons and the like, and also of super polyurethane fibers.

The novel dyestuffs according to the invention are of the formula

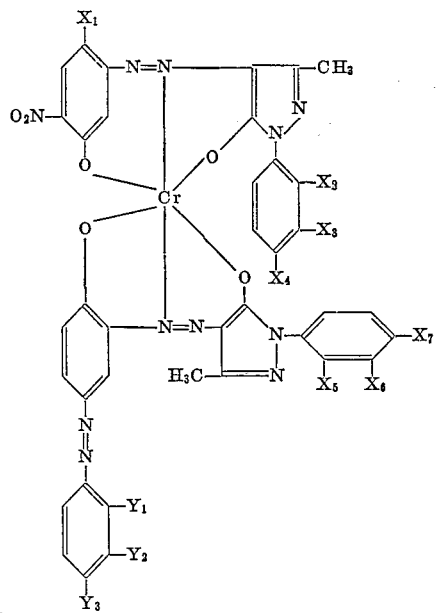

wherein:

one of $X_1$, $X_2$, $X_3$ and $X_4$ represents —$SO_3H$, $X_1$ when not —$SO_3H$ represents chlorine or lower alkyl;

each of $X_2$, $X_3$ and $X_4$ which is not —$SO_3H$ represents hydrogen, chlorine, lower alkyl or lower alkoxy;

each of $X_5$, $X_6$ and $X_7$ represents hydrogen, chlorine, lower alkyl or lower alkoxy; and each of $Y_1$, $Y_2$ and $Y_3$ represents hydrogen, nitro, chlorine, lower alkyl or lower alkoxy;

but preferably $X_1$ represents —$SO_3H$ and of all $X_2$ to $X_7$, inclusive, and all Y's only one represents one further substituent other than hydrogen, namely chlorine, methyl, ethyl, methoxy, ethoxy or nitro; but optimally all of $X_2$ to $X_7$, inclusive, and all Y's represent hydrogen atoms, or all of them represent hydrogen with the exception of $X_3$ which represents chlorine; and dye the aforementioned fiber materials in red shades which have very good all-round fastness properties, especially fastness to light, rubbing and wet fastness properties, namely fastness to washing, perspiration, sea water, decatizing water, hot water, alkaline water or water containing chlorine, alkaline and acid milling, and to cross-dyeing especially of nylon/wool blended fabrics, from a weakly acid dyebath. These fastness properties are particularly and unexpectedly satisfactory in dyeings on super polyamide fibers, especially Nylon 6, Nylon 66 and wool. With respect to wool, the dyestuffs have a very good neutral drawing power. Even damaged wool, for instance, tippy wool can be dyed uniformly with the dyestuffs of the present invention. It is another advantage of the dyestuffs of the present invention to have a very high fastness to wool chlorination.

Very surprising is the superior light fastness of dyestuffs according to the invention, particularly when compared to that of structurally most closely related known dyestuffs.

Preparation of dyestuffs according to the invention are illustrated in the following non-limitative examples. Temperatures are given therein in degrees centigrade.

EXAMPLE 1

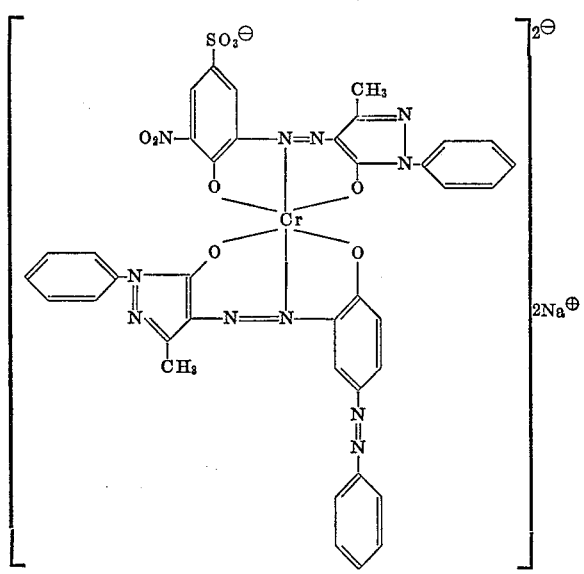

39.8 grams (g.) of the disazo dyestuffs from diazotized 3 - amino - 4 - hydroxyazobenzene and 1 - phenyl - 3-methylpyrazol-5-one are suspended in a solution of 20 g. of anhydrous sodium carbonate in 800 ml. of water at about 85° and 46.9 parts of the 1:1 chromium complex compound corresponding to 5.2 g. of chromium and 41.9 g. of the dyestuff 6-nitro-4-sulfo-2-amino-1-hydroxybenzene → 1-phenyl-3-methyl pyrazole-5-one are added. The suspension obtained is heated for 1 hour at 85° whereupon a dark red solution is obtained. The dyesutff thus formed is salted out with sodium chloride, filtered off and dried. It is a dark red powder which dyes wool, silk, leather and especially synthetic super polyamide fibers, in red shades of high grade fastness.

By using instead of the disazo dyestuff described in the above example, one of those given in column II of the following table and instead of the 1:1 chromium complex compound used above, a 1:1 chromium complex compound of one of the azo dyestuffs given in column III of the same table, and otherwise following the same procedure as in the preceding example, the corresponding dyestuffs falling under Formula I are obtained which have the shades given in column IV of the table below.

TABLE

| No. | Disazo Dyestuff | 1:1 Cr-Complex of | Shade |
|---|---|---|---|
| 2 | Ph-N=N-C6H3(OH)-N=N-[pyrazolone: 3-CH3, 1-Ph, 5-OH] | 3-NO2-2-OH-5-HO3S-C6H2-N=N-[pyrazolone: 3-CH3, 1-(3-Cl-C6H4), 5-OH] | Red. |
| 3 | Ph-N=N-C6H3(OH)-N=N-[pyrazolone: 3-CH3, 1-Ph, 5-OH] | 3-NO2-2-OH-5-H3S-C6H2-N=N-[pyrazolone: 3-CH3, 1-(4-SO3H-C6H4), 5-OH] | Red. |
| 4 | Ph-N=N-C6H3(OH)-N=N-[pyrazolone: 3-CH3, 1-Ph, 5-OH] | 3-NO2-2-OH-5-HO3S-C6H2-N=N-[pyrazolone: 3-CH3, 1-(4-OCH3-C6H4), 5-OH] | Red. |
| 5 | Ph-N=N-C6H3(OH)-N=N-[pyrazolone: 3-CH3, 1-Ph, 5-OH] | 3-NO2-2-OH-5-HO3S-C6H2-N=N-[pyrazolone: 3-CH3, 1-(2-CH3-C6H4), 5-OH] | Red. |
| 6 | 2-OCH3-C6H4-N=N-C6H3(OH)-N=N-[pyrazolone: 3-CH3, 1-Ph, 5-OH] | 3-NO2-2-OH-5-Cl-C6H2-N=N-[pyrazolone: 3-CH3, 1-(3-SO3H-C6H4), 5-OH] | Brownish red. |
| 7 | 4-O2N-C6H4-N=N-C6H3(OH)-N=N-[pyrazolone: 3-CH3, 1-Ph, 5-OH] | 3-NO2-2-OH-5-HO3S-C6H2-N=N-[pyrazolone: 3-CH3, 1-Ph, 5-OH] | Do. |
| 8 | 2-Cl-C6H4-N=N-C6H3(OH)-N=N-[pyrazolone: 3-CH3, 1-Ph, 5-OH] | 3-NO2-2-OH-5-HO3S-C6H2-N=N-[pyrazolone: 3-CH3, 1-Ph, 5-OH] | Red. |
| 9 | Ph-N=N-C6H3(OH)-N=N-[pyrazolone: 3-CH3, 1-(3-Cl-C6H4), 5-OH] | 3-NO2-2-OH-5-HO3S-C6H2-N=N-[pyrazolone: 3-CH3, 1-Ph, 5-OH] | Red. |
| 10 | Ph-N=N-C6H3(OH)-N=N-[pyrazolone: 3-CH3, 1-(4-CH3-C6H4), 5-OH] | 3-NO2-2-OH-5-HO3S-C6H2-N=N-[pyrazolone: 3-CH3, 1-(4-OC2H5-C6H4), 5-OH] | Red. |

TABLE—Continued

| I No. | II Disazo Dyestuff | III 1:1 Cr-Complex of | IV Shade |
|---|---|---|---|
| 11 | | | Red. |
| 12 | | | Red. |
| 13 | | | Red. |
| 14 | | | Red. |
| 15 | | | Red. |

EXAMPLE 16

100 g. of Nylon 6 fabric are introduced at a temperature of 40–50° into a dyebath which has been prepared by dissolving 2 g. of the dyestuff of Example 1 in 4000 ml. of water and adding 2 g. of the condensation product of lorol ($C_{11}$–$C_{18}$) with 15–20 molecular equivalents of ethylene oxide, as well as 2 g. of ammonium sulfate. The dyebath is heated within 30 minutes to boiling and kept for one hour at the boil. The fabric is then rinsed with water and dried. The resulting red dyeing has excellent light fastness as well as very good fastness to perspiration, seawater and washing. The dyeing is practically free from stripiness.

EXAMPLE 17

100 g. of well-dampened wool are introduced at a temperature of about 45° into a dyebath consisting of a solution of 2 g. of the dyestuff of Example 1 in 4000 ml. of water. 3 g. of ammonium sulfate are then added to the dyebath; the whole is heated to boiling within 30 minutes and kept for 45 minutes at the boil. The wool is then rinsed with cold water and dried. The resulting red dyeing is of excellent light fastness and wet fastness. Tippy wool is dyed very uniformly.

We claim:
1. A chromium complex dyestuff of the formula

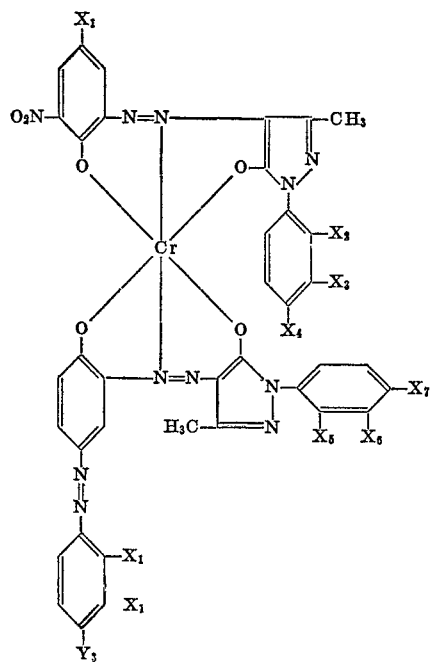

wherein:

one of $X_1$, $X_2$, $X_3$ and $X_4$ represents —$SO_3H$, $X_1$ when not —$SO_3H$ represents chlorine or lower alkyl, each of $X_2$, $X_3$ and $X_4$ which is not —$SO_3H$ represents hydrogen, chlorine, lower alkyl or lower alkoxy, each of $X_5$, $X_6$ and $X_7$ represents hydrogen, chlorine, lower alkyl or lower alkoxy, and each of $Y_1$, $Y_2$ and $Y_3$ represents hydrogen, nitro, chlorine, lower alkyl or lower alkoxy.

2. A chromium complex dyestuff as defined in claim 1 which is of the formula

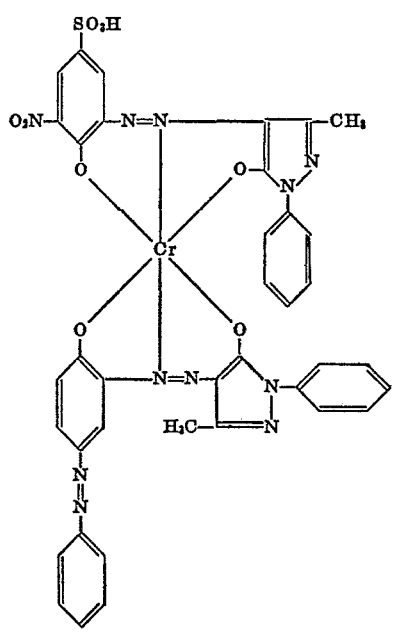

3. A chromium complex dyestuff as defined in claim 1 which is of the formula

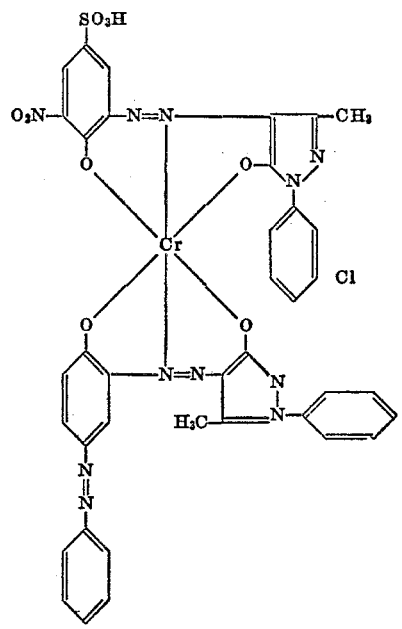

References Cited

UNITED STATES PATENTS

| | | | |
|---|---|---|---|
| 2,753,334 | 7/1956 | Buehler et al. | 260—145 |
| 2,806,760 | 9/1957 | Brassel et al. | 260—145 XR |
| 2,826,572 | 3/1958 | Kuster et al. | 260—145 |
| 3,041,327 | 6/1962 | Buehler et al. | 260—145 |
| 3,062,806 | 11/1962 | Biedermann et al. | 260—147 |

FLOYD D. HIGEL, Primary Examiner

U.S. Cl. X.R.

8—4, 10, 13, 42, 43; 117—138; 260—37, 147, 163